(12) United States Patent
Yoshinaga et al.

(10) Patent No.: US 9,592,495 B2
(45) Date of Patent: Mar. 14, 2017

(54) AMMONIA SYNTHESIS CATALYST

(71) Applicant: DENSO CORPORATION, Kariya, Aichi-pref. (JP)

(72) Inventors: Masaki Yoshinaga, Nisshin (JP); Hiroaki Yotou, Kariya (JP); Goh Iijima, Nisshin (JP); Yoshimasa Hijikata, Miyoshi (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/573,439

(22) Filed: Dec. 17, 2014

(65) Prior Publication Data

US 2015/0174558 A1    Jun. 25, 2015

(30) Foreign Application Priority Data

Dec. 24, 2013  (JP) ................................. 2013-265616

(51) Int. Cl.
*B01J 27/02* (2006.01)
*B01J 27/06* (2006.01)
(Continued)

(52) U.S. Cl.
CPC ............. *B01J 27/18* (2013.01); *B01J 27/053* (2013.01); *B01J 27/135* (2013.01); *B01J 35/004* (2013.01); *B01J 35/0013* (2013.01); *C01C 1/0411* (2013.01); *B01J 21/063* (2013.01); *B01J 23/38* (2013.01); *B01J 23/70* (2013.01); *B01J 37/24* (2013.01); *B01J 37/28* (2013.01)

(58) Field of Classification Search
CPC . B01J 21/063; B01J 27/02; B01J 27/06; B01J 27/16; B01J 27/18; B01J 27/053; B01J 27/135
USPC ..... 502/350; 423/352, 359, 362; 204/157.46
See application file for complete search history.

(56) References Cited

U.S. PATENT DOCUMENTS 2,726,991 A * 12/1955 Zimmerschied ......... B01J 27/16
                                                   208/223
3,589,865 A *  6/1971 van Tamelen ............ C01C 1/02
                                                   423/352
(Continued)

FOREIGN PATENT DOCUMENTS

JP    2001-072985    3/2001
JP    2003-200057    7/2003
(Continued)

OTHER PUBLICATIONS

"Photolysis of Water and Photoreduction of Nitrogen on Titanium Dioxide," G. N. Schrauzer et al. Journal of the American Chemical Society, vol. 99, Issue 22 (Oct. 1977), pp. 7189-7193.*

*Primary Examiner* — Patricia L Hailey
(74) *Attorney, Agent, or Firm* — Harness, Dickey & Pierce, P.L.C.

(57) ABSTRACT

An ammonia synthesis catalyst synthesizing ammonia from nitrogen in a presence of moisture is provided. The ammonia synthesis catalysis includes a catalyst particle including an inorganic material that has a photocatalytic function and an inorganic acid. The catalyst particle is preferably an n-type semiconductor and includes oxide material including at least titanium preferably. The inorganic acid preferably corresponds to at least one of perchloric acid, hydrochloric acid, sulfuric acid, and phosphoric acid.

15 Claims, 4 Drawing Sheets

(51) Int. Cl.
  *B01J 27/16* (2006.01)
  *B01J 27/18* (2006.01)
  *B01J 27/135* (2006.01)
  *B01J 27/053* (2006.01)
  *B01J 35/00* (2006.01)
  *C01C 1/04* (2006.01)
  *B01J 37/24* (2006.01)
  *B01J 37/28* (2006.01)
  *B01J 21/06* (2006.01)
  *B01J 23/38* (2006.01)
  *B01J 23/70* (2006.01)

(56) References Cited

U.S. PATENT DOCUMENTS

| | | | | |
|---|---|---|---|---|
| 4,081,510 A | * | 3/1978 | Kato | B01D 53/8634 423/237 |
| 4,113,590 A | * | 9/1978 | Schrauzer | C01C 1/04 204/157.46 |
| 4,113,660 A | * | 9/1978 | Abe | B01D 53/8628 423/239.1 |
| 4,427,510 A | * | 1/1984 | Lichtin | B01J 19/122 204/157.46 |
| 4,612,096 A | * | 9/1986 | Lichtin | C01C 1/04 204/157.46 |
| 4,762,600 A | * | 8/1988 | Khader | C01C 1/04 204/157.46 |
| 4,938,855 A | * | 7/1990 | Lichtin | C01C 1/0405 204/157.46 |
| 2010/0209329 A1 | * | 8/2010 | Furbeck | B01D 53/9418 423/352 |
| 2012/0258033 A1 | | 10/2012 | Kameyama et al. | |
| 2014/0228199 A1 | | 8/2014 | Yoshinaga et al. | |
| 2015/0174557 A1 | | 6/2015 | Yotou et al. | |

FOREIGN PATENT DOCUMENTS

| | | |
|---|---|---|
| JP | 2005-281104 | 10/2005 |
| JP | 2008-221037 | 9/2008 |
| JP | 2010-195703 | 9/2010 |
| JP | 2012-055786 | 3/2012 |

* cited by examiner

FIG. 5

| EXAMPLE AND COMPARATIVE EXAMPLE | CATALYST PART | INORGANIC ACID | CONDUCTIVE POLYM | GENERATION AMOUNT OF AMMONIUM ION (mg/L) |
|---|---|---|---|---|
| EX1 | $TiO_2$ | $HClO_4$ | — | 1.03 |
| EX2 | $TiO_2$ | HCl | — | 0.85 |
| EX3 | $TiO_2$ | $H_2SO_4$ | — | 0.62 |
| EX4 | $TiO_2$ | $H_3PO_4$ | — | 0.54 |
| COMP 1 | $TiO_2$ | — | — | 0.1 |
| COMP 2 | $TiO_2$ | — | PEDOT | 0.18 |

AMMONIA SYNTHESIS CATALYST

CROSS REFERENCE TO RELATED APPLICATION

This application is based on Japanese Patent Application No. 2013-265616 filed on Dec. 24, 2013, the disclosure of which is incorporated herein by reference.

TECHNICAL FIELD

The present disclosure relates to a catalyst that synthesizes ammonia from nitrogen.

BACKGROUND

Patent literature: JP-A-2012-55786

Harber-Bosch process is known as an industrial synthesis method of ammonia. However, since a fossil fuel is used as a raw material in the Harber-Bosch process, a depletion of resources may not be averted. Since a reaction at high temperature and pressure is required in the Harber-Bosch process, a large amount of energy may be consumed. Thus, a development of a method alternative to the Harber-Bosch process may be required.

For example, patent literature 1 discloses a nitrogen fixation material that includes a nanoparticle of titanium oxide having a photocatalytic function and a conductive polymer covering the nanoparticle of titanium oxide. The nitrogen fixation material fixes nitrogen in the atmosphere as an ammonium salt or the like when light is irradiated to the nitrogen fixation material in the presence of nitrogen and moisture such as the atmosphere and it is possible to recover the nitrogen. That is, it is possible to produce ammonia using the nitrogen and moisture contained in the atmosphere as a raw material in place of the fossil fuel and using natural energy such as sunlight as energy.

The applicants of the present disclosure have found the following with respect to conventional nitrogen fixation materials. The conventional nitrogen fixation material may solve a problem of a raw material and energy. However, a generation speed of the ammonia may be low. That is, according to the conventional nitrogen fixation material, a generation amount of the ammonia may not sufficiently increase after a light irradiation.

SUMMARY

It is an object of the present disclosure to provide an ammonia synthesis, catalyst that synthesizes ammonia at high generation rate at the time of light irradiation.

According to one aspect of the present disclosure, an ammonia synthesis catalyst synthesizing ammonia from nitrogen in a presence of moisture is provided. The ammonia synthesis catalyst includes a catalyst particle and an inorganic acid. The catalyst particle includes an inorganic material that has a photocatalytic function.

According to the ammonia synthesis catalyst, the catalyst particle having the photocatalytic function is activated by irradiation of light of sunlight or the like. A hydrogen ion is generated from moisture by the activated catalyst particle and the inorganic acid. Due to the hydrogen ion, the ammonia is synthesized from the nitrogen. As a result, the synthesis catalyst enables to synthesize the ammonia. It is possible that the synthesis catalyst synthesizes the ammonia at a high generation rate due to an interaction between the catalyst particle and the inorganic acid at the time of light irradiation. It is possible that the synthesis catalyst synthesizes the ammonia utilizing natural light such as the sunlight as an energy source. In addition, it is possible that the synthesis catalyst synthesizes the ammonia from the atmosphere since the synthesis catalyst enables to synthesize the ammonia from the nitrogen.

BRIEF DESCRIPTION OF THE DRAWINGS

The above and other objects, features and advantages of the present disclosure will become more apparent from the following detailed description made with reference to the accompanying drawings. In the drawings:

FIG. 5 is a drawing illustrating a generation amount of an ammonium ion after light irradiation in first to fourth examples, comparative examples.

DETAILED DESCRIPTION

Figure 1:
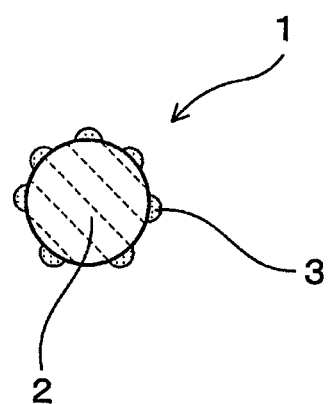
FIG. 1 is a drawing schematically illustrating an ammonia synthesis catalyst in a first example.

Embodiments of the present disclosure will be hereinafter described. The ammonia synthesis catalyst (hereinafter, also referred to as a synthesis catalyst for simplicity) includes at least a catalyst particle and an inorganic acid. The synthesis catalyst is used in the presence of moisture such as in the atmosphere or the like. Alternatively, the synthesis catalyst itself may include moisture. Specifically, it may be considered that the ammonia synthesis catalyst includes a catalyst particle whose surface is attached with the inorganic acid and moisture, for example. It may be preferable that the inorganic acid is ionized.

The catalyst particle is made from an inorganic material having a photocatalytic function. It may be preferable that the catalyst particle corresponds to an n-type semiconductor. The n-type semiconductor means a semiconductor in which a free electron is used as a carrier for carrying an electric charge. The inorganic material may correspond to, for example, a metal oxide, a metal complex oxide, or the like. More specifically, the metal oxide corresponds to at least one selected from titanium oxide ($TiO_2$), tungstic oxide ($WO_3$), tin oxide ($SnO_2$), cupper oxide (CuO), zinc oxide (ZnO), gallium oxide ($Ga_2O_5$), zirconium oxide ($ZrO_2$), tantalum oxide ($Ta_2O_5$), niobium oxide ($Nb_2O_5$), molybdenum oxide ($MoO_3$), vanadium oxide ($V_2O_5$), or the like. The metal complex oxide may correspond to complex oxide or the like at least including metallic element configuring each of the above metal oxides. It may be preferable that the catalyst particle is made from metal oxide including at least titanium. The metal oxide including at least the titanium may correspond to at least one of titanium oxide, sodium titanate, strontium titanate, barium titanate, iron titanate, zirconium titanate, or the like.

When the metal oxide corresponds to the titanium oxide, the titanium oxide may be amorphous. More preferably, the titanium oxide may correspond to a rutile-type titanium oxide, an anatase-type titanium oxide, or a combination of the rutile-type titanium oxide and the anatase-type titanium oxide. In this case, it may be possible to improve a catalyst activity of a synthesis catalyst.

It may be preferable that an average particle diameter of the catalyst particle is equal to 100 nm or less. In this case, a contact area with nitrogen in the synthesis catalyst may increase. Therefore, it may be possible to improve the catalyst activity of the synthesis catalyst. From a similar point of view, it may be more preferable that the average particle diameter of the catalyst particle is equal to 50 nm or less. Since it may become difficult to manufacture or obtain the catalyst particle when the average particle diameter is too small, it may be preferable that the average particle diameter of the catalyst particle is equal to 1 nm or more. More preferably, the average particle diameter of the catalyst particle may be equal to 5 nm or more. Incidentally, the average particle diameter represents a particle size with 50% volume integrated value of size distribution calculated with a laser diffraction-scattering method.

Metal may be supported on a surface of the catalyst particle. In this case, it may be possible to further improve the catalyst activity of the synthesis catalyst. The metal, which is supported on the surface of the catalyst particle, may be at least one selected from Pd, Ag, Ru, Rh, Pt, Au, Ir, Ni, Fe, Cu, Cr, Co, Ir, or the like.

The inorganic acid may correspond to, for example, hydrofluoric acid, hydrochloric acid, hydroiodic acid, boric acid, carbonic acid, perchloric acid, nitric acid, sulfuric acid, phosphoric acid, or the like. The inorganic acid may correspond to one or more selected from the above described inorganic acids. It may be preferable that a pKa value of the inorganic acid is equal to 5 or less. More preferably, the pKa value of the inorganic acid may be equal to zero or less. In this case, it may be possible to improve the catalyst activity of the synthesis catalyst and to increase a synthesis rate of the ammonia.

Incidentally, a combination ratio of the catalyst particle and the inorganic acid is a design item. For example, the amount of the inorganic acid to 1 mmol of a material configuring the catalyst particle may be from 0.001 mmol to 1 mmol.

EXAMPLES

First Example

Examples synthesizing the ammonia with the synthesis catalyst in the present disclosure will be explained.

As described in FIG. 1, a synthesis catalyst 1 in a first example includes a catalyst particle 2 and an inorganic acid 3. The catalyst particle 2 is made from an inorganic material with a photocatalytic function. In the first example, the catalyst particle 2 corresponds to a particle (that is, a titanium oxide particle) of titanium oxide. The inorganic acid 3 corresponds to perchloric acid. The inorganic acid 3 exists on a surface of the catalyst particle 2.

Figure 2A:
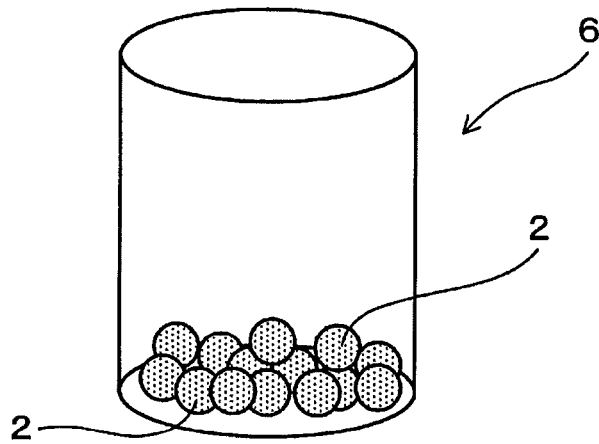
FIG. 2A is a drawing illustrating a first manufacturing process of the ammonia synthesis catalyst in the first example.

The synthesis catalyst 1 is produced by the following means. Specifically, a titanium oxide particle of 10 mg is inputted into a sample bottle 6 of 5 ml as described in FIG. 2A. The titanium oxide particle corresponds to AEROXIDE (a registered trademark) $TiO_2$ P25 made by NIPPON AEROSIL CO., LTD. The titanium oxide particle in the present example has the average particle diameter of 20 nm and a mixture of a rutile-type titanium oxide and an anatase-type titanium oxide.

Figure 2B:
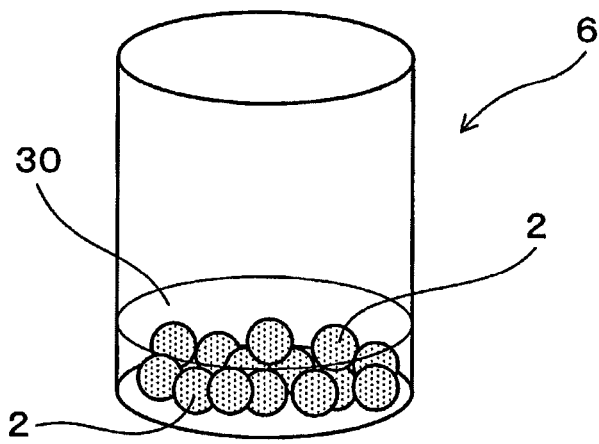
FIG. 2B is a drawing illustrating a second manufacturing process of the ammonia synthesis catalyst in the first example.
Figure 2C:
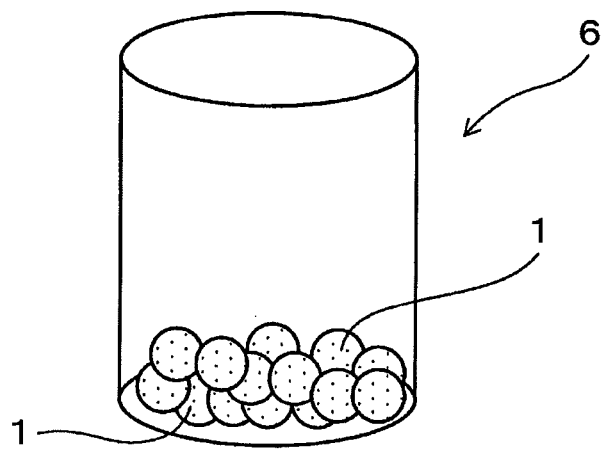
FIG. 2C is a drawing illustrating a third manufacturing process of the ammonia synthesis catalyst in the first example.

A water solution 30 of perchloric acid ($HClO_4$) of a concentration 60 wt % is added into the sample bottle 6 as described in FIG. 2B. The water solution 30 is added so that the amount of $HClO_4$ to the 1 mmol $TiO_2$ is equal to 0.008 mmol. Subsequently, the inside of the sample bottle 6 is dried up at the 80 degrees Celsius for 1 hour. The perchloric acid may be attached to the surface of catalyst particle 2. As described in FIG. 2C, the ammonia synthesis catalyst 1 is obtained in the sample bottle 6. Incidentally, the ammonia synthesis catalyst 1 may also referred to as a synthesis catalyst 1 for simplicity.

A synthesis method of the ammonia using the ammonia synthesis catalyst 1 will be explained.

Figure 3:
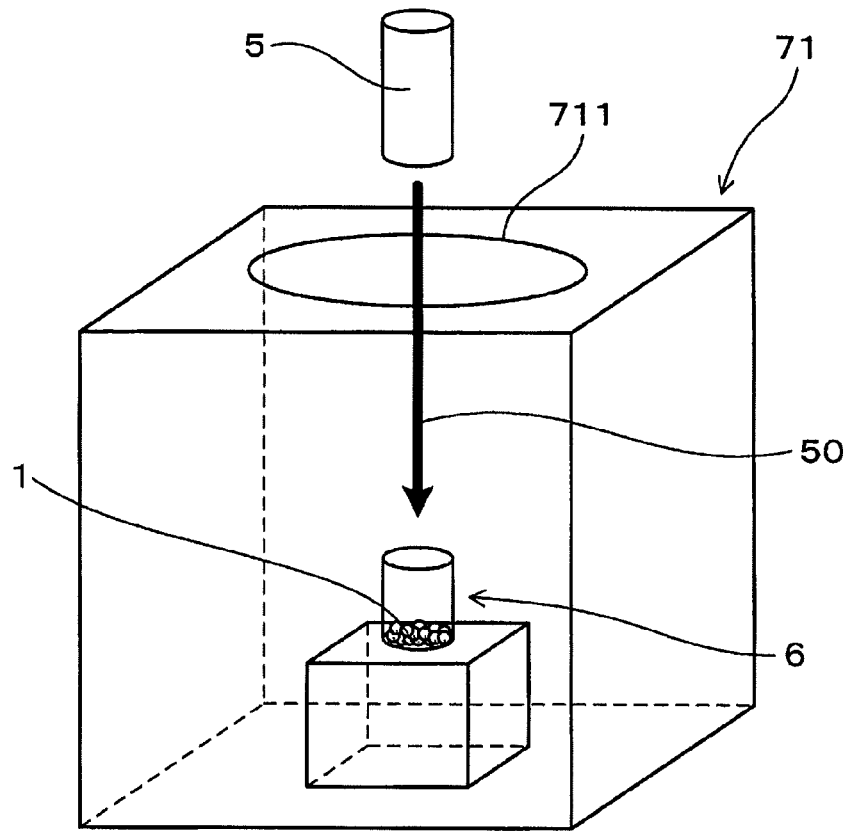
FIG. 3 is a drawing illustrating a method of synthesizing ammonia in the first example.

Initially, as describe in FIG. 3, an acrylic container 71 having a quartz window 711 on an upper surface of the acrylic container 71 is prepared. The sample bottle 6, which includes the synthesis catalyst 1, is placed to the inside of the acrylic container 71. An irradiation area (also referred to as an exposure area) of light 50 for the synthesis catalyst 1 is equal to 2 $cm^2$. In addition, a relative humidity in the acrylic container 71 is adjusted to 70% with a humidity conditioning agent. The inside of the acrylic container 71 is under an ordinary temperature and pressure.

As described in FIG. 3, light 50 from a pseudo sunlight lamp 5 is irradiated to the synthesis catalyst 1 through the quartz window 711, which is provided to the acrylic container 71. A XC-100BF1RC 100 W made by SERIC Ltd., is used as the pseudo sunlight lamp 5. Incidentally, an intensity of the light 50 of the pseudo sunlight lamp 5 is equal to 260 $W/m^2$, and an irradiation time corresponds to one week.

Distilled water of 5 ml is added to the synthesis catalyst 1 so that the ammonia fixed to the synthesis catalyst 1 after generation is dissolved into the distilled water as an ammonium ion. Accordingly, ammonium aqueous solution is obtained. A concentration of the ammonium ion included in the ammonium aqueous solution is detected with an ion chromatography ICS-1500, column: CS16 made by Nippon Dionex K. K. A generation amount of the ammonium ion after light irradiation will be illustrated in FIG. 5.

Second Example, Third Example, and Fourth Example

In second to fourth examples, a different kind of the inorganic acid from the first example is used, and the ammonia synthesis catalyst is produced. In the second example, hydrochloric acid (HCl) is used as the inorganic acid. In the third example, sulfuric acid ($H_2SO_4$) is used as the inorganic acid. In the fourth example, phosphoric acid ($H_3PO_4$) is used as the inorganic acid. In the second to fourth examples, the ammonia synthesis catalyst is produced similar to the first example, except that a kind of the inorganic acid is changed. The ammonia is synthesized in the second to fourth examples, similar to the first example. FIG. 5 illustrates results.

First Comparative Example

In the present comparative example, the ammonia is synthesized with a catalyst particle made from a titanium oxide particle without including the inorganic acid. The titanium oxide particle is similar to the titanium oxide particle in the first example. The synthesis of the ammonia is performed similar to the first example using the catalyst particle of 10 mg made from the titanium oxide particle. A result is illustrated in FIG. 5.

Second Comparative Example

In the second comparative example, the ammonia is synthesized using a catalyst including a titanium oxide particle and a conductive polymer covering the titanium oxide particle. The conductive polymer corresponds to poly (3,4-ethylenedioxythiophene). The poly(3,4-ethylenedioxythiophene) corresponds to PEDOT.

To produce the catalyst in the second comparative example, the titanium oxide particle of 10 mg similar to the first example is inputted into a 5 ml sample bottle. Subsequently, poly(3, 4-ethylenedioxythiophene) of 100 mg is added into the sample bottle, and an agitation mixing is performed. Incidentally, the poly(3, 4-ethylenedioxythiophene) is made by Sigma-Aldrich Co. LLC. Subsequently, the inside of the sample bottle 6 is dried up at the 80 degrees Celsius for 1 hour. The catalyst including the titanium oxide particle and the conductive polymer covering the titanium oxide particle is obtained. The synthesis of the ammonia similar to the first example is performed using the catalyst. A result is illustrated in FIG. 5.

Comparison with First to Fourth Examples and Comparative Examples

Result of the first to fourth examples and the first to second comparative examples are illustrated in FIG. 5.

As described in FIG. 5, the synthesis catalyst 1 including the catalyst particle 2 and the inorganic acid 3 in the first to fourth examples synthesizes the ammonia from the nitrogen in the atmosphere in the presence of moisture (referring to FIG. 1). The generation amount of the ammonium ion after the light irradiation in the first to fourth examples is higher as compared with the first and second comparison examples, and the ammonia is synthesized in the first to fourth examples at a higher generation rate as compared with the first and second comparative examples. The synthesis catalyst 1 enables to synthesize the ammonia by natural light such as the sunlight.

Figure 4:
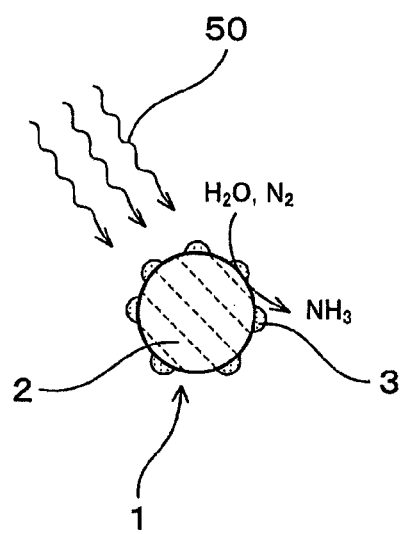
FIG. 4 is a drawing schematically illustrating a synthesizing mechanism of the ammonia by the synthesis catalyst in the present examples.

A mechanism at the time when the synthesis catalyst 1 in the first to fourth examples synthesizes the ammonia will be explained referring to FIG. 4. As described in FIG. 4, in the atmosphere where the nitrogen and moisture exist, the nitrogen ($N_2$) is reduced at a boundary face between the catalyst particle 2 having the photocatalytic function and the inorganic acid 3 when the light 50 is irradiated to the synthesis catalyst 1. A proton ($H^+$) is generated from moisture ($H_2O$) and is consumed. The nitrogen is reduced, and the ammonia is generated.

It may be preferable that the catalyst particle 2 include an oxidized material including at least titanium. More preferably, the catalyst particle 2 may include the titanium oxide. In this case, it may be possible to synthesize the ammonia at a high generation rate as described in the examples. In addition, as similar to the titanium oxide, a complex oxide including titanium, which has a function of an n-type semiconductor, may have the similar effects of the first to fourth examples. Preferably, the complex oxide may have an excellent function as the n-type semiconductor.

The inorganic acid 3 may correspond to any kinds of acid. It may be preferable that the inorganic acid 3 corresponds to at least one selected from a group consisting of the perchloric acid, the hydrochloric acid, the sulfuric acid, and the phosphoric acid. In this case, it may be possible to surely synthesize the ammonia at the high generation rate as described in the first to fourth examples. More preferably, the inorganic acid 3 may be acid including halogen such as the perchloric acid, the hydrochloric acid, or the like. Furthermore preferably, the inorganic acid 3 may include at least the perchloric acid. In this case, as described in the result of the first example (referring to FIG. 5), it may be possible to further increase the generation rate of the ammonia.

It may be preferable that the inorganic acid 3 exists on a surface of the catalyst particle 2. In this case, it may be possible to surely synthesize the ammonia at the boundary face between the catalyst particle 2 and the inorganic acid 3.

In the first to fourth examples, the amount of the inorganic acid to the 1 mmol $TiO_2$ corresponds to 0.08 mmol. Although it is not illustrated in FIG. 5, the applicants of the present disclosure have confirmed that the generation rate of the ammonia is further increased by increasing the amount of the inorganic acid. For example, when the amount of the perchloric acid to the 1 mmol $TiO_2$ corresponds to 0.036 mmol, an increased amount of the ammonium ion corresponds to 1.5 mg/L after exposure for 1 week. In addition, when the amount of the inorganic acid corresponds to 0.233 mmol, the increased amount of the ammonium ion corresponds to 1.82 mg/L.

According to one aspect of the present disclosure, an ammonia synthesis catalyst that synthesizes ammonia from nitrogen in the presence of moisture is provided. The ammonia synthesis catalyst includes a catalyst particle made from an inorganic material having a photocatalytic function and an inorganic acid. The ammonia synthesis catalyst may also be referred to as a synthesis catalyst.

In the synthesis catalyst, the catalyst particle having the photocatalytic function is activated by irradiation of light of sunlight or the like. A hydrogen ion is generated from water in moisture by the activated catalyst particle and the inorganic acid. Due to the hydrogen ion, the ammonia is synthesized from the nitrogen. As a result, the synthesis catalyst enables to synthesize the ammonia. In addition, it is possible that the synthesis catalyst synthesizes the ammonia at a high generation rate due to an interaction between the catalyst particle and the inorganic acid at the time of light irradiation. In addition, it is possible that the synthesis catalyst synthesizes the ammonia utilizing natural light such as the sunlight as an energy source. In addition, it is possible that the synthesis catalyst synthesizes the ammonia from the atmosphere since the synthesis catalyst enables to synthesize the ammonia from the nitrogen.

It should be noted that the synthesis catalyst does not necessary require an organic material in a constituent components. Therefore, the organic material may not be decomposed by the light irradiation. Thus, the catalyst activity may be hardly reduced by the light irradiation. Therefore, it is possible that the synthesis catalyst synthesizes the sufficient amount of the ammonia at the high generation rate.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An ammonia synthesis catalyst synthesizing ammonia from nitrogen in a presence of moisture comprising:
a catalyst particle including an inorganic material that has a photocatalytic function; and
an inorganic acid.

2. The ammonia synthesis catalyst according to claim 1, wherein the catalyst particle comprises an n-type semiconductor.

3. The ammonia synthesis catalyst according to claim 1, wherein the catalyst particle includes oxide that includes at least titanium.

4. The ammonia synthesis catalyst according to claim 1, wherein the inorganic acid comprises at least one of perchloric acid, hydrochloric acid, sulfuric acid and phosphoric acid.

5. The ammonia synthesis catalyst according to claim 1, wherein the inorganic acid comprises at least perchloric acid.

6. The ammonia synthesis catalyst according to claim 1, wherein the inorganic acid is attached to a surface of the catalyst particle.

7. The ammonia synthesis catalyst according to claim 6, wherein the catalyst particle comprises at least one of the rutile-type titanium oxide and an anatase-type titanium oxide.

8. The ammonia synthesis catalyst according to claim 7, wherein the inorganic acid comprises at least perchloric acid.

9. The ammonia synthesis catalyst according to claim 7, wherein the inorganic acid comprises at least hydrochloric acid.

10. The ammonia synthesis catalyst according to claim 7, wherein the inorganic acid comprises at least sulfuric acid.

11. The ammonia synthesis catalyst according to claim 7, wherein the inorganic acid comprises at least phosphoric acid.

12. The ammonia synthesis catalyst according to claim 1, wherein the inorganic material that has the photo catalytic function comprises at least one of titanium oxide, sodium titanate, strontium titanate, barium titanate, iron titanate, and zirconium titanate; and
the inorganic acid comprises at least one of hydrofluoric acid, hydrochloric acid, hydroiodic acid, boric acid, carbonic acid, perchloric acid, nitric acid, sulfuric acid, and phosphoric acid.

13. The ammonia synthesis catalyst according to claim 1, wherein the inorganic material that has the photocatalytic function comprises titanium oxide; and
the inorganic acid comprises at least one of hydrochloric acid, perchloric acid, nitric acid, sulfuric acid, and phosphoric acid.

14. An ammonia synthesis catalyst that synthesizes ammonia from nitrogen in presence of moisture, comprising:
a catalyst particle including titanium oxide as an inorganic material that has a photocatalytic function; and
at least one of hydrochloric acid, perchloric acid, nitric acid, sulfuric acid, and phosphoric acid as an inorganic acid,
wherein when the ammonia synthesis catalyst is irradiated with light in atmosphere including nitrogen and moisture, ammonia is generated from water and nitrogen.

15. An ammonia synthesis catalyst synthesizing ammonia from nitrogen in a presence of moisture, the ammonia synthesis catalyst comprising:
a catalyst particle including an inorganic material that has a photocatalytic function, the catalyst particle being selected from the group consisting of tungstic oxide, tin oxide, copper oxide, zinc oxide, gallium oxide, zirconium oxide, tantalum oxide, niobium oxide, molybdenum oxide, vanadium oxide, titanium oxide, sodium titanate, strontium titanate, barium titanate, iron titanate, and zirconium titanate; and
an inorganic acid selected from the group consisting of hydrofluoric acid, hydrochloric acid, hydroiodic acid, boric acid, carbonic acid, perchloric acid, nitric acid, sulfuric acid, and phosphoric acid.

* * * * *